US010499683B2

(12) United States Patent
Carroll et al.

(10) Patent No.: US 10,499,683 B2
(45) Date of Patent: *Dec. 10, 2019

(54) PRODUCT PORTION ENROBING PROCESS AND APPARATUS, AND RESULTING PRODUCTS

(71) Applicant: Altria Client Services LLC, Richmond, VA (US)

(72) Inventors: Andrew Nathan Carroll, Chester, VA (US); Shannon Maxwell Black, Richmond, VA (US); Yan Helen Sun, Midlothian, VA (US); William J. Burke, Nashville, TN (US); Robert Smith, Glen Allen, VA (US)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/261,515

(22) Filed: Sep. 9, 2016

(65) Prior Publication Data

US 2017/0208854 A1 Jul. 27, 2017

Related U.S. Application Data

(62) Division of application No. 14/213,317, filed on Mar. 14, 2014, now Pat. No. 9,462,827.

(Continued)

(51) Int. Cl.
*A24B 15/18* (2006.01)
*D01D 11/06* (2006.01)
(Continued)

(52) U.S. Cl.
CPC .............. *A24B 15/186* (2013.01); *A24B 3/14* (2013.01); *A24B 13/00* (2013.01); *A24B 15/14* (2013.01);
(Continued)

(58) Field of Classification Search
CPC ........ D01D 13/00; A24B 15/186; A24F 23/02
See application file for complete search history.

(56) References Cited

U.S. PATENT DOCUMENTS

| 1,684,421 A | 9/1928 | Thompson |
| 2,580,609 A | 1/1952 | Schur et al. |

(Continued)

FOREIGN PATENT DOCUMENTS

| DE | 10346649 | 5/2005 | |
| EP | 2449894 A1 * | 5/2012 | ............. A24B 13/00 |

(Continued)

OTHER PUBLICATIONS

Nishida, Automatic Cotton Candy Machine (https://www.youtube.com/watch?v=T6MIAn4m8K0), Aug. 2006 [viewed online Jan. 30, 2018].*

(Continued)

*Primary Examiner* — Anthony Calandra
(74) *Attorney, Agent, or Firm* — Harness, Dickey & Pierce, P.L.C.

(57) ABSTRACT

A method of enrobing a product portion in polymer strands includes mounting at least one product portion on a holding device and passing the at least one product portion through a polymer enrobing zone. The polymer enrobing zone can include a flow of polymeric fibers produced by a polymer spray head. The polymer fibers can wraparound the at least one product portion to produce an enrobed product portion. The holding device can hold the at least one product portion by passing at least partially through the body of the product portion. At least a portion of the holding device is removed from the enrobed product portion. In some cases, the at least one product portion includes smokeless tobacco.

18 Claims, 8 Drawing Sheets

Related U.S. Application Data

(60) Provisional application No. 61/786,295, filed on Mar. 14, 2013.

(51) Int. Cl.
| | | |
|---|---|---|
| *A24F 23/02* | (2006.01) | |
| *D01D 5/00* | (2006.01) | |
| *A24B 3/14* | (2006.01) | |
| *A24B 13/00* | (2006.01) | |
| *D01D 5/18* | (2006.01) | |
| *D01D 5/098* | (2006.01) | |
| *B65G 15/44* | (2006.01) | |
| *B65G 51/02* | (2006.01) | |
| *B65G 15/24* | (2006.01) | |
| *A24B 15/28* | (2006.01) | |
| *A24B 15/14* | (2006.01) | |
| *A24B 15/40* | (2006.01) | |
| *B05B 13/02* | (2006.01) | |

(52) U.S. Cl.
CPC ............ *A24B 15/28* (2013.01); *A24B 15/403* (2013.01); *A24F 23/02* (2013.01); *B05B 13/0221* (2013.01); *B65G 15/24* (2013.01); *B65G 15/44* (2013.01); *B65G 51/02* (2013.01); *D01D 5/0084* (2013.01); *D01D 5/0985* (2013.01); *D01D 5/18* (2013.01); *D01D 11/06* (2013.01)

(56) References Cited

U.S. PATENT DOCUMENTS

| | | |
|---|---|---|
| 2,734,509 A | 2/1956 | Jurgensen, Jr. |
| 4,084,627 A | 4/1978 | Focke et al. |
| 4,090,521 A | 5/1978 | Elsner |
| 4,360,328 A | 11/1982 | Kassabian |
| 4,380,570 A | 4/1983 | Schwarz |
| 4,516,590 A | 5/1985 | Teng |
| 4,526,733 A | 7/1985 | Lau |
| 4,528,993 A | 7/1985 | Sensabaugh, Jr. et al. |
| 4,660,577 A | 4/1987 | Sensabaugh et al. |
| 4,725,446 A | 2/1988 | Forster |
| 4,848,373 A | 7/1989 | Lenkey |
| 4,987,907 A | 1/1991 | Townend |
| 5,063,104 A | 11/1991 | Robertson et al. |
| 5,146,955 A | 9/1992 | Steiner et al. |
| 5,372,149 A | 12/1994 | Roth et al. |
| 5,476,616 A | 12/1995 | Schwarz |
| 5,528,993 A | 6/1996 | Vincelli |
| 5,645,790 A | 7/1997 | Schwarz et al. |
| 6,013,223 A | 1/2000 | Schwarz |
| 6,207,601 B1 | 3/2001 | Maurer et al. |
| 6,455,030 B2 | 9/2002 | Saito et al. |
| 6,709,623 B2 | 3/2004 | Haynes et al. |
| 6,716,498 B2 | 4/2004 | Curro et al. |
| 6,849,330 B1 | 2/2005 | Morin et al. |
| 7,156,937 B2 | 1/2007 | Provost et al. |
| 7,465,366 B2 | 12/2008 | Provost et al. |
| 7,547,469 B2 | 6/2009 | Provost et al. |
| 7,562,426 B2 | 7/2009 | Barker et al. |
| 7,666,261 B2 | 2/2010 | Bailey et al. |
| 7,718,556 B2 | 5/2010 | Matsuda et al. |
| 7,810,507 B2 | 10/2010 | Dube et al. |
| 9,763,473 B2 | 9/2017 | Carroll et al. |
| 10,039,309 B2 | 8/2018 | Carroll et al. |
| 10,258,076 B2 | 4/2019 | Carroll et al. |
| 2004/0038022 A1 | 2/2004 | Maugans et al. |
| 2004/0038790 A1 | 2/2004 | Pehmoller et al. |
| 2004/0118421 A1 | 6/2004 | Hodin et al. |
| 2004/0118422 A1 | 6/2004 | Lundin et al. |
| 2004/0209540 A1 | 10/2004 | Schwarz |
| 2005/0056956 A1 | 3/2005 | Zhao et al. |
| 2005/0178398 A1 | 8/2005 | Breslin et al. |
| 2005/0196580 A1 | 9/2005 | Provost et al. |
| 2005/0196583 A1 | 9/2005 | Provost et al. |
| 2005/0217092 A1 | 10/2005 | Barker et al. |
| 2005/0244521 A1 | 11/2005 | Strickland et al. |
| 2006/0191548 A1 | 8/2006 | Strickland et al. |
| 2006/0264130 A1 | 11/2006 | Karles et al. |
| 2006/0292271 A1 | 12/2006 | King |
| 2007/0261707 A1 | 11/2007 | Winterson et al. |
| 2008/0209586 A1 | 8/2008 | Nielsen et al. |
| 2008/0302682 A1 | 12/2008 | Wngstrom et al. |
| 2008/0305297 A1 | 12/2008 | Barker et al. |
| 2008/0308115 A1 | 12/2008 | Zimmermann |
| 2009/0133703 A1 | 5/2009 | Strickland et al. |
| 2009/0203280 A9 | 8/2009 | Provost et al. |
| 2009/0256277 A1 | 10/2009 | Brown et al. |
| 2009/0258099 A1 | 10/2009 | Brown et al. |
| 2009/0258562 A1 | 10/2009 | Brown et al. |
| 2010/0018539 A1 | 1/2010 | Brinldey et al. |
| 2010/0018882 A1 | 1/2010 | St. Charles |
| 2010/0170522 A1 | 7/2010 | Sun et al. |
| 2010/0242978 A1 | 9/2010 | Fuisz |
| 2010/0300465 A1 | 12/2010 | Zimmermann |
| 2011/0036364 A1 | 2/2011 | Pienemann et al. |
| 2011/0083688 A1 | 4/2011 | Mishra et al. |
| 2011/0220130 A1 | 9/2011 | Mua et al. |
| 2012/0024301 A1 | 2/2012 | Carroll et al. |
| 2012/0031414 A1 | 2/2012 | Atchley et al. |
| 2012/0031416 A1 | 2/2012 | Atchley et al. |
| 2012/0103353 A1 | 5/2012 | Sebastian et al. |

FOREIGN PATENT DOCUMENTS

| | | |
|---|---|---|
| GB | 2373988 A | 10/2002 |
| WO | WO 2005/046363 | 5/2005 |
| WO | WO 2005/115180 | 12/2005 |
| WO | WO-2008/015573 A2 | 2/2008 |
| WO | WO-2009/010878 A2 | 1/2009 |
| WO | WO 2009/048522 | 4/2009 |
| WO | WO 2009/063010 | 5/2009 |

OTHER PUBLICATIONS

International Preliminary Report on Patentability in International Application No. PCT/US2014/028389, dated Sep. 24, 2015, 7 pages.
International Search Report and Written Opinion in International Application No. PCT/US2014/028389, dated Aug. 4 2014, 9 pages.
Making Cosmetics, Polysaccharides (Sugars, Gums) used in Cosmetics, downloaded online Oct. 29, 2015.
Rydholm, Pulping Processes, Interscience Publishers, 1967, 51-52.
Tso, Chapter 1 in Tobacco, Production, Chemistry and Technology, 1999, Davis & Nielsen, eds., Blackwell Publishing, Oxford.
Office Action for correponding U.S. Appl. No. 15/688,114, dated Jul. 10, 2018.
International Search Report and Written Opinion in International Application No. PCT/US2014/028354, dated Jul. 10, 2014, 12 pages.
International Preliminary Report on Patentability in International Application No. PCT/US2014/028354, dated Sep. 24, 2015, 10 pages.
International Search Report and Written Opinion in International Application No. PCT/US2014/028325, dated Sep. 8, 2014, 12 pages.
International Preliminary Report on Patentability in International Application No. PCT/US2014/028325, dated Sep. 24, 2015, 10 pages.
United States Office Action for corresponding U.S. Appl. No. 16/426,476 dated Jul. 30, 2019.
European Office Action for corresponding Application No. 14717364.5-1105, dated Jun. 11, 2019.
U.S. Appl. No. 16/380,095, filed Apr. 10, 2019.
U.S. Appl. No. 16/426,476, filed May 30, 2019.

* cited by examiner

PRODUCT PORTION ENROBING PROCESS AND APPARATUS, AND RESULTING PRODUCTS

CROSS REFERENCE TO RELATED APPLICATIONS

This application is a divisional of U.S. application Ser. No. 14/213,317, filed on Mar. 14, 2014, which claims the benefit of priority under 35 U.S.C. § 119(e) to U.S. Application No. 61/786,295 filed Mar. 14, 2013. The prior applications are incorporated herein by reference in their entirety.

FIELD

This disclosure generally relates to processes and machines for enrobing product portions with polymeric fibers, and the resulting enrobed products. In some cases, portions of smokeless tobacco can be enrobed in polymeric fibers to create a fiber-wrapped smokeless tobacco product.

BACKGROUND

Smokeless tobacco is tobacco that is placed in the mouth and not combusted. There are various types of smokeless tobacco, including: chewing tobacco, moist smokeless tobacco, snus, and dry snuff. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between a cheek and gum of an adult tobacco consumer. Snus is a heat treated smokeless tobacco. Dry snuff is finely ground tobacco that is placed in the mouth or used nasally.

Smokeless tobacco can be pouched in a permeable fabric using a pouching machine where a supply of pouching material is sealed around a deposit of smokeless tobacco material. Such a pouch holds the tobacco in place, while at the same time letting the flavours and substances of the tobacco pass through the walls of the pouch and into the mouth of an adult tobacco consumer. A conventional pouching machine may form a supply of pouching material around a (or the) tube, seal the edges of the pouching material to form a tube of pouching material, form a cross-seal to form a bottom of the pouch, deliver an amount of smokeless tobacco through the tube and into the bottom-sealed pouch, move the bottom-sealed pouch off the tube, and form a second cross seal above the smokeless tobacco to close the pouch. The second cross seal can also be used as the bottom seal for a subsequent pouch as the process continues. Individual pouches can be cut at the cross-seals. FIG. 7 depicts an example of a pouched smokeless tobacco product made using a traditional pouching machine.

SUMMARY

Methods and machines provided herein can be used to enrobe a product portion (e.g., a smokeless tobacco product portion) with polymeric fibers. Polymeric fiber enrobed product portions can be used in a number of consumer products, such as smokeless tobacco products and herbal products (e.g., tea). As compared to a conventional pouch made using a conventional pouching machine, a fiber-wrapped smokeless tobacco portion made using the methods and machines provided herein can have an improved mouth feel (e.g., no discernible seams), be more permeable, and/or be more chewable. Methods and machines provided herein can be used to efficiently and reliably enrobe multiple product portions.

Methods of enrobing a product portion in polymer strands provided herein can include mounting at least one product portion on a holding device and passing the at least one product portion through a polymer enrobing zone. The polymeric enrobing zone can be formed by using a polymer spray head to create a flow of polymeric fibers. The holding device can pass at least partially through the body of the at least one product portion. The holding device can be moved to pass the at least one product portion through the polymer enrobing zone such that a plurality of the polymeric fibers wraparound the at least one product portion to produce an enrobed product portion. At least a portion of said holding device can then be removed from the enrobed product portion. The holding device can be any suitable holding device.

In some cases, the holding device can be a needle. In some cases, the needle can pass all the way through the body of the product portion. In some cases, the needle can pass partly through the body of the product portion. In some cases, the needle can be inserted into the body to pass between 30% and 90% through the thickness of the body. In some cases, the needle is metal. In some cases, the needle is polymeric. In some cases, the needle is fully removed from the product portion. In some cases, the needle is cut to leave a portion of the needle in an interior of the body. In some cases, the needle is heated before, during, or after the passing of the at least one product portion through the polymer enrobing zone.

In some cases, the holding device can be a string. The string holding device can be made out of any suitable material. In some cases, the string holding device comprises of cellulosic fibers, polymeric fibers, or a combination thereof. In some cases, a string holding device can be food grade and cut without being removed form a product portion. In some cases, one or more product portions are mounted on the string holding device by molding one or more product portions around the string holding device. In some cases, multiple product portions can be on a single string. In some cases, removing at least a portion of the string holding device is achieved by cutting the string to leave a portion of the string in the interior of the product portion.

The holding device can move one or more product portions through the polymer enrobing zone such that polymeric fibers wrap around and/or enrobe the at least one product portion. In some cases, the holding device can rotate to expose multiple surfaces of one or more product portions to a stream of polymeric fibers exiting the polymer spray head. In some cases, the holding device can change orientations to expose multiple surfaces of one or more product portions to a stream of polymeric fibers exiting the polymer spray head.

Methods provided herein can include a process of collecting at least some of said plurality of polymeric fibers on a polymer collection roller positioned opposite the polymer enrobing zone. In some cases, fibers collected on the polymer collection roller can be recycled or used to make additional products.

An apparatus for enrobing a product portion provided herein can include a polymer spray head arranged to direct a flow of plurality of polymeric fibers to create a polymer enrobing zone and one or more holding devices adapted to move a product portion through the polymer enrobing zone.

In some cases, the at least one holding device is adapted to change orientations and/or rotate to expose multiple surfaces of one or more product portions to a flow of polymeric fibers in the polymer enrobing zone. In some cases, an apparatus provided herein can include a molding device adapted to form at least one product portion in at least one mold cavity. In some cases, a molding device provided herein is adapted to form one or more product portions around the holding device. In some cases, an apparatus provided herein includes a robotic arm adapted insert one or more holding device into one or more mold cavities and to move the holding device between the molding device and the polymer enrobing zone. In some cases, an apparatus provided herein includes a cutting device adapted to cut at least a portion of the holding device. In some cases, an apparatus provided herein includes a heater to heat one or more holding devices. In some cases, an apparatus provided herein includes a polymer collection roller opposite the polymer enrobing zone adapted to collect polymeric fibers that are not wrapped around product portions passed through the polymer enrobing zone. In some cases, an apparatus provided herein includes a polymer spray head that is elongated.

Methods and machines provided herein can, in some cases, direct molten polymer towards one or more product portions in the polymer enrobing zone such that the molten polymer naturally wraps around the three dimensional product portion. Molten polymer from one or more polymer spray heads can in the polymer enrobing zone can quickly solidify once cooled to create a random orientation of meshed polymeric fibers that completely wrap the product portion. In some cases, polymeric fibers provided herein (e.g., polyurethane, polypropylene, etc.) can stick to themselves after solidifying, which can avoid a need to seal a resulting enrobed product portion. For example, smokeless tobacco product portions provided herein can be enrobed in polyurethane and/or polypropylene to form a seamless outer layer, thus avoiding the seams commonly found in conventionally pouched smokeless tobacco products.

Product portions enrobed in methods and machines provided herein can be any suitable product. Product portions enrobed herein can be products with sufficient integrity to not fall apart when levitated within the polymer enrobing zone. In some cases, product portions enrobed in methods provided herein include consumable products (e.g., tobacco, herbal products such as teas, mint, etc.). In some cases, product portions enrobed in methods provided herein have an overall oven volatiles content of about 4% by weight to about 61% by weight. In some cases, a binder can be included in the product portion to have the product portion retain its integrity during the enrobing process provided herein. In some cases, a product portion can include between 0.1 and 0.5 weight percent of a binder. Suitable binders include guar gum, xanthan gum, cellulose gum, and combinations thereof.

In some cases, a fiber-wrapped product portion produced using methods and machines provided herein can include a plurality of polymeric fibers surrounding the product portion. The polymeric fibers overlying the product portion can have a basis weight of 40 grams per square meter (gsm) or less, 30 gsm or less, 20 gsm or less, 10 gsm or less, or 5 gsm or less. The polymeric fibers can have diameters of less than 100 microns. In some cases, the polymeric fibers are melt-blown polymeric fibers. In some cases, the polymeric fibers are force-spun polymeric fibers. In some cases, an electrostatic charge can be applied to the plurality of polymeric fibers, one or more product portions, or a combination thereof. In some cases, a spin is applied to the product portions when passing through the polymer enrobing zone. In some cases, the polymer fibers wrap and seal the body of the product portions simultaneously. In some cases, combinations of mouth-stable and mouth-dissolvable polymeric materials are combined to form a fiber-wrapped product portion that becomes looser when consumed, yet remains generally cohesive. The polymeric fibers can also be a composite of multiple materials, which may include both mouth-stable and mouth-dissolvable materials.

Fiber-wrapped smokeless tobacco products produced using methods and machines provided herein provide a unique tactile and flavor experience to an adult tobacco consumer. In particular, the polymeric fibers can provide a smoother mouth texture and improved access to the smokeless tobacco, improved porosity, and improved fluid exchange as compared to a traditional pouching material, but still retain the smokeless tobacco. Moreover, the methods provided herein can result in a seamless wrapping of polymeric fibers, which can reduce mouth irritation. Furthermore, in some cases, polymeric fibers (e.g., polyurethane fibers) provided herein can be more elastic and can permit an adult tobacco consumer to chew/squeeze the fiber-wrapped smokeless tobacco product and mold the product into a desired shape (e.g., to comfortably conform the product between the cheek and gum). As compared to a typical pouch paper, the fiber wrappings produced using methods and machines provided herein can be softer, have a lower basis weight, and act as less of a selective membrane. Additionally, methods and machines provided herein avoid a need to use a cutting device and a sealing device, which are commonly used in conventional packaging machines.

Products provided herein include seamless fiber-wrapped smokeless tobacco products that include a body comprising smokeless tobacco, a plurality of melt-blown or centrifugal force spun polymeric fibers surrounding the smokeless tobacco, and a string segment passing through said body. In some cases, a fiber-wrapped smokeless tobacco product includes smokeless tobacco and a plurality of polymeric fibers surrounding the smokeless tobacco. The polymeric fibers can have a basis weight of 30 grams per square meter (gsm) or less, 20 gsm or less, 10 gsm or less, or 5 gsm or less. The polymeric fibers can have diameters of less than 100 microns. In some cases, the polymeric fibers are melt-blown polymeric fibers. In some cases, the polymeric fibers are force-spun polymeric fibers.

Products, methods, and machines described herein can also be applied to other orally consumable plant materials in addition to smokeless tobacco. For example, some non-tobacco or "herbal" compositions have also been developed as an alternative to smokeless tobacco compositions. Non-tobacco products may include a number of different primary ingredients, including but not limited to, tea leaves, red clover, coconut flakes, mint leaves, citrus fiber, bamboo fiber, ginseng, apple, corn silk, grape leaf, and basil leaf. In some cases, such a non-tobacco smokeless product can further include tobacco extracts, which can result in a non-tobacco smokeless product providing a desirable mouth feel and flavor profile. In some cases, the tobacco extracts can be extracted from a cured and/or fermented tobacco by mixing the cured and/or fermented tobacco with water and/or other solvents and removing the non-soluble tobacco material. In some cases, the tobacco extracts can include nicotine. In some cases, a pouched non-tobacco product has an overall oven volatiles content of between 10 and 61 weight percent.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

Like reference symbols in the various drawings indicate like elements.

DETAILED DESCRIPTION

Methods and machines provided herein can be used to enrobe one or more product portions (e.g., smokeless tobacco product portions) with polymeric fibers. Methods and machines provided herein can be used to efficiently and reliably enrobe multiple product portions. Methods and machines provided herein can distribute polymeric fibers onto a product portion evenly across all surfaces of a product portion. In some cases, methods and machines provided herein can achieve a uniform application of polymeric fibers on all sides of multiple product portions in an automated process. Fiber-wrapped smokeless tobacco product portions provided herein include a body including smokeless tobacco enrobed with polymeric fibers.

Methods and machines provided herein achieve a desired coverage of one or more product portions with polymeric fibers by controlling a movement of one or more product portions in a polymer enrobing zone. Methods and machines provided herein mount one or more product portions on a holding device and use holding device to move the one or more product portions in a polymer enrobing zone. In some cases, methods and machines provided herein can minimize gaps produced due to the presence of the holding device. In some cases, methods and machines provided herein can be adapted such that at least a portion of the holding device can be removed without damaging the enrobed product portion. In some cases, methods and machines provided herein can be adapted such that a portion of the holding device remains a part of one or more enrobed product portions. Methods and machines provided herein can keep product portions in the polymer enrobing zone for a desired amount of time a plurality of different orientations.

Polymer enrobing zone can be created by a polymer spray head. The flow of polymeric fibers out of the polymer spray head can cause polymeric fibers to adhere to the one or more product portions and/or wrap around the one or more product portions. Product portions held by a holding device provided herein can be introduced to the polymer enrobing zone and rotated about one, two, three, or more axes in order to achieve desired coating thicknesses. In some cases, machines provided herein include a controller adapted to move one or more holding devices along a pre-programmed path in order to enrobe product portions according to a desired polymer-fiber coating thickness.

Figure 1:
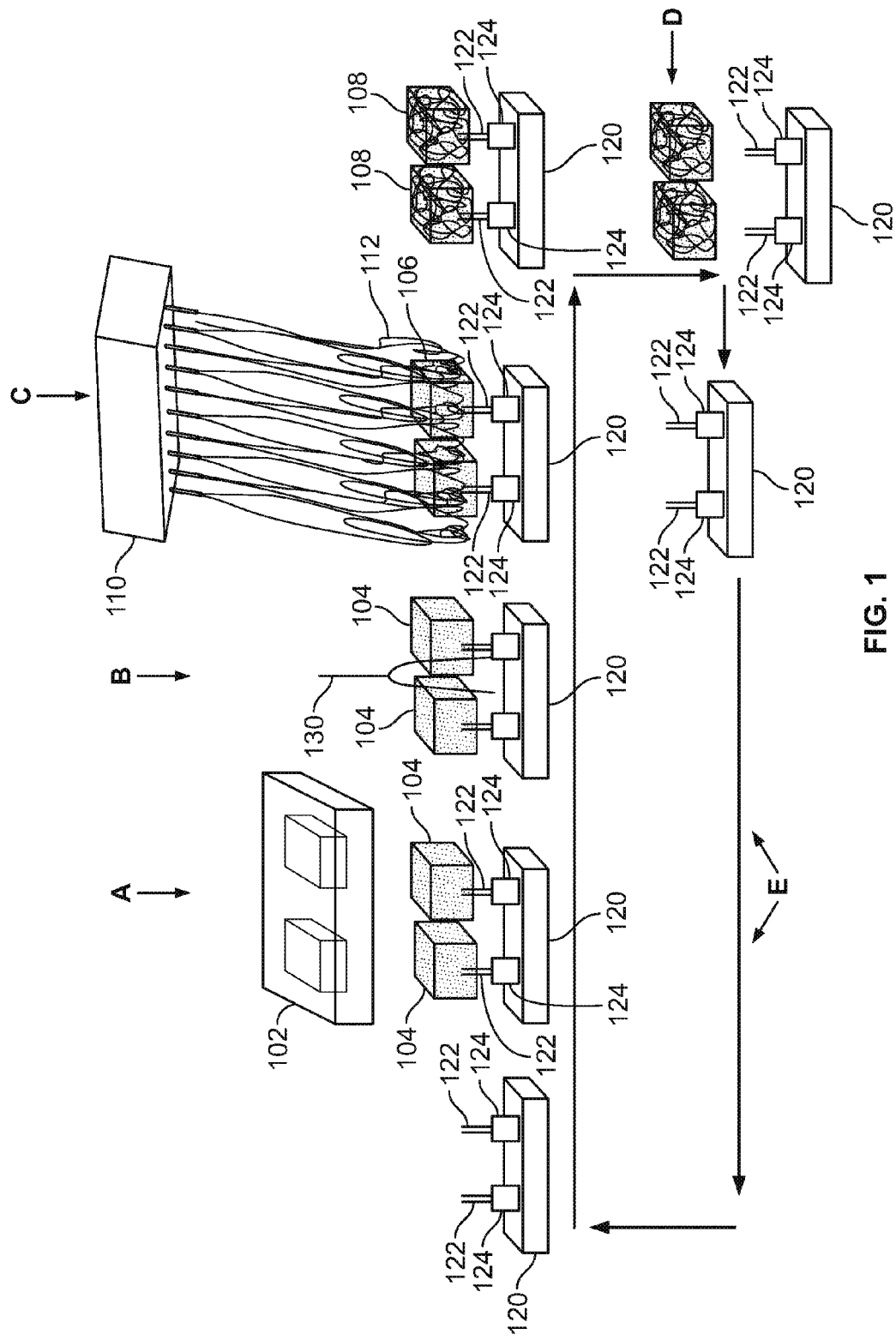
FIG. 1 depicts an exemplary flow diagram showing an exemplary method provided herein.
Figure 2A:
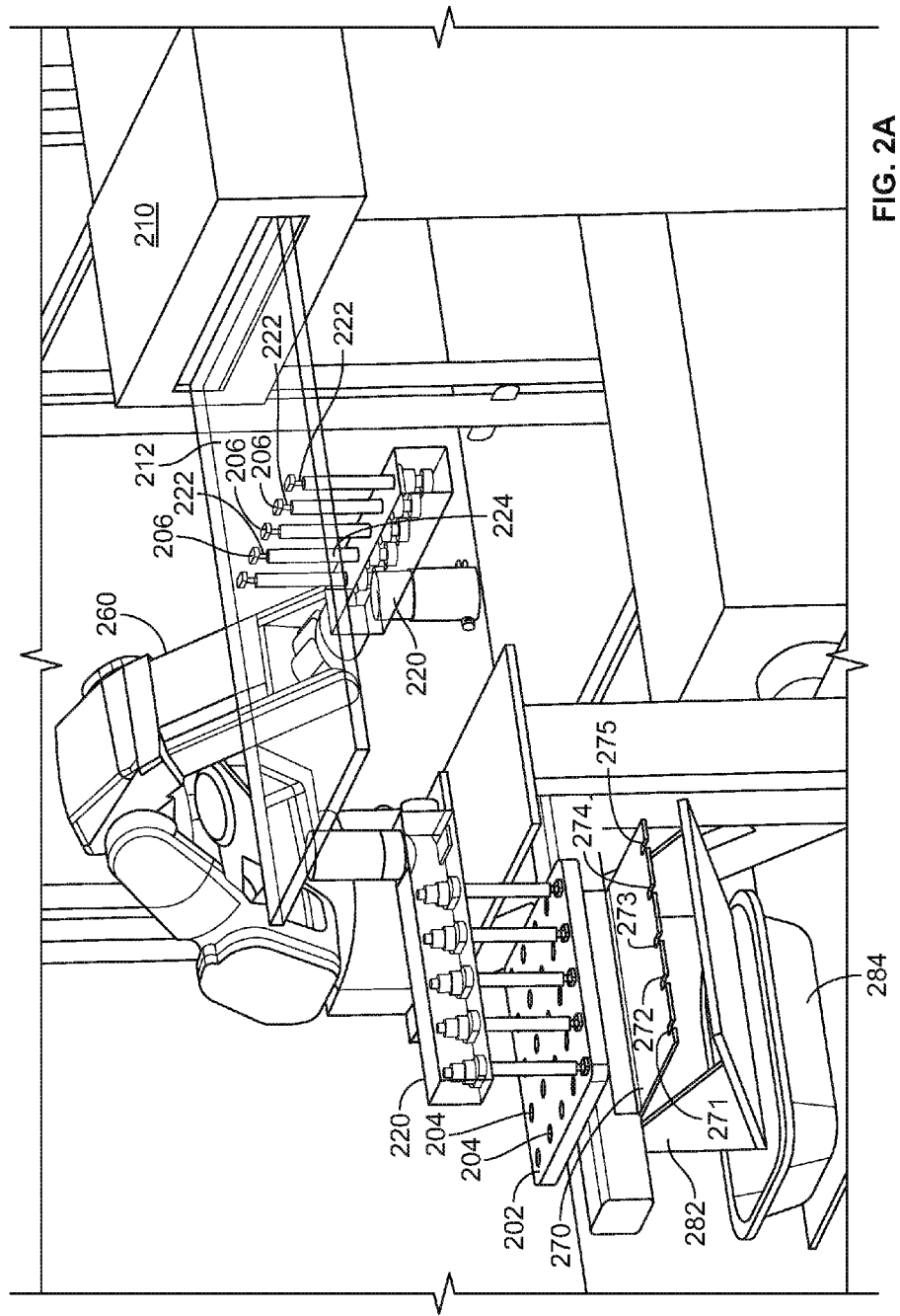
FIG. 2A depicts an exemplary embodiment of an apparatus provided herein including a robotic arm and needle holding devices.
Figure 2B:
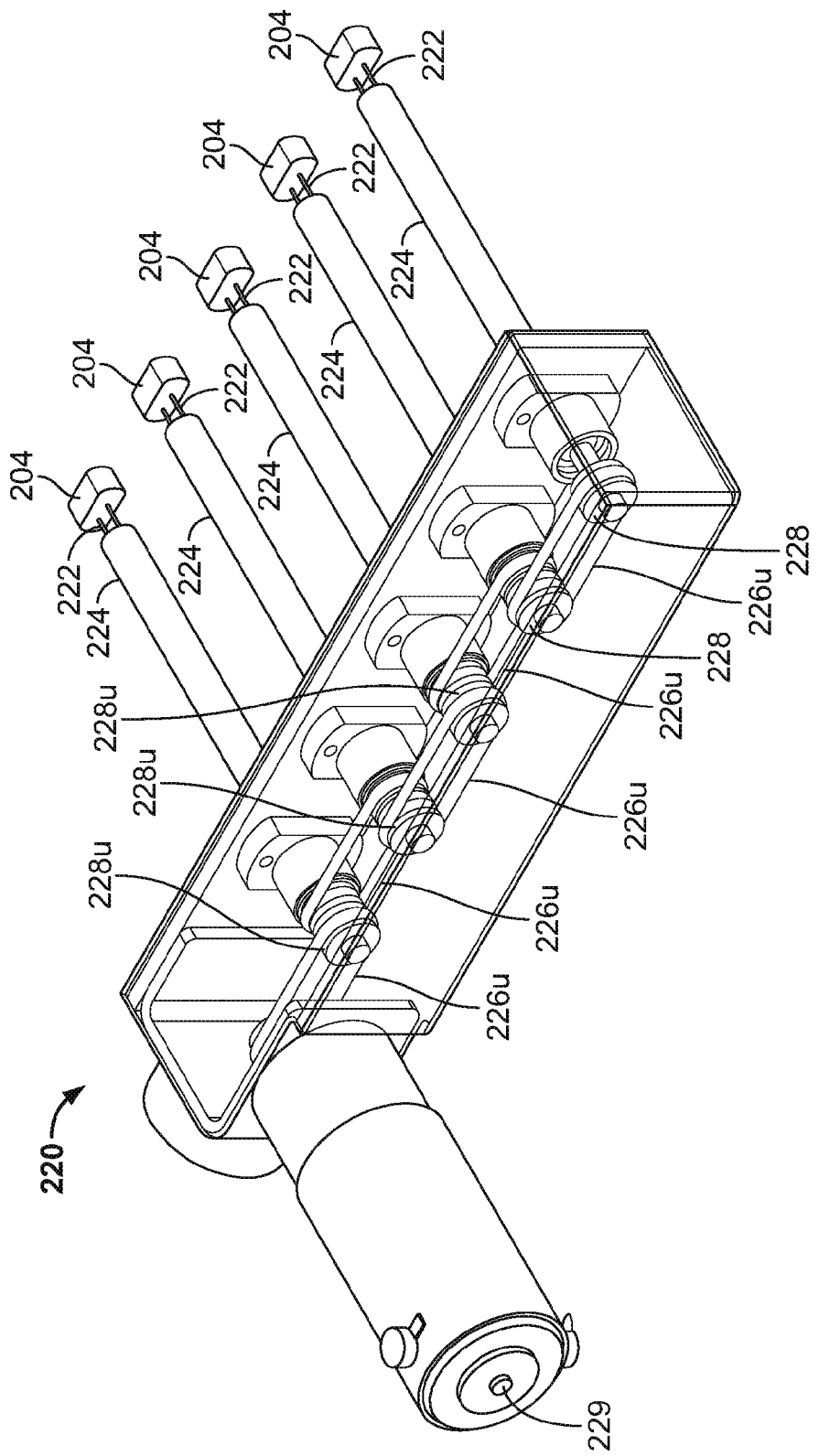
FIG. 2B depicts additional details of the needle holding device of FIG. 2A.

In some cases, the holding device can be a needle. For example, FIGS. 1, 2A, and 2B depict exemplary embodiments that include needle holding devices that penetrate a product portion. In some cases, the needle can pass all the way through the body of the product portion. In some cases, the needle can pass partly through the body of the product portion. In some cases, the needle can be inserted into the body to pass between 30% and 90% through the thickness of the body. In some cases, the needle is metal. In some cases, the needle is polymeric. In some cases, the needle is fully removed from the product portion. In some cases, the needle is cut to leave a portion of the needle in an interior of the body. In some cases, the needle is heated before, during, or after the passing of the product portion through the polymer enrobing zone.

Figure 3:
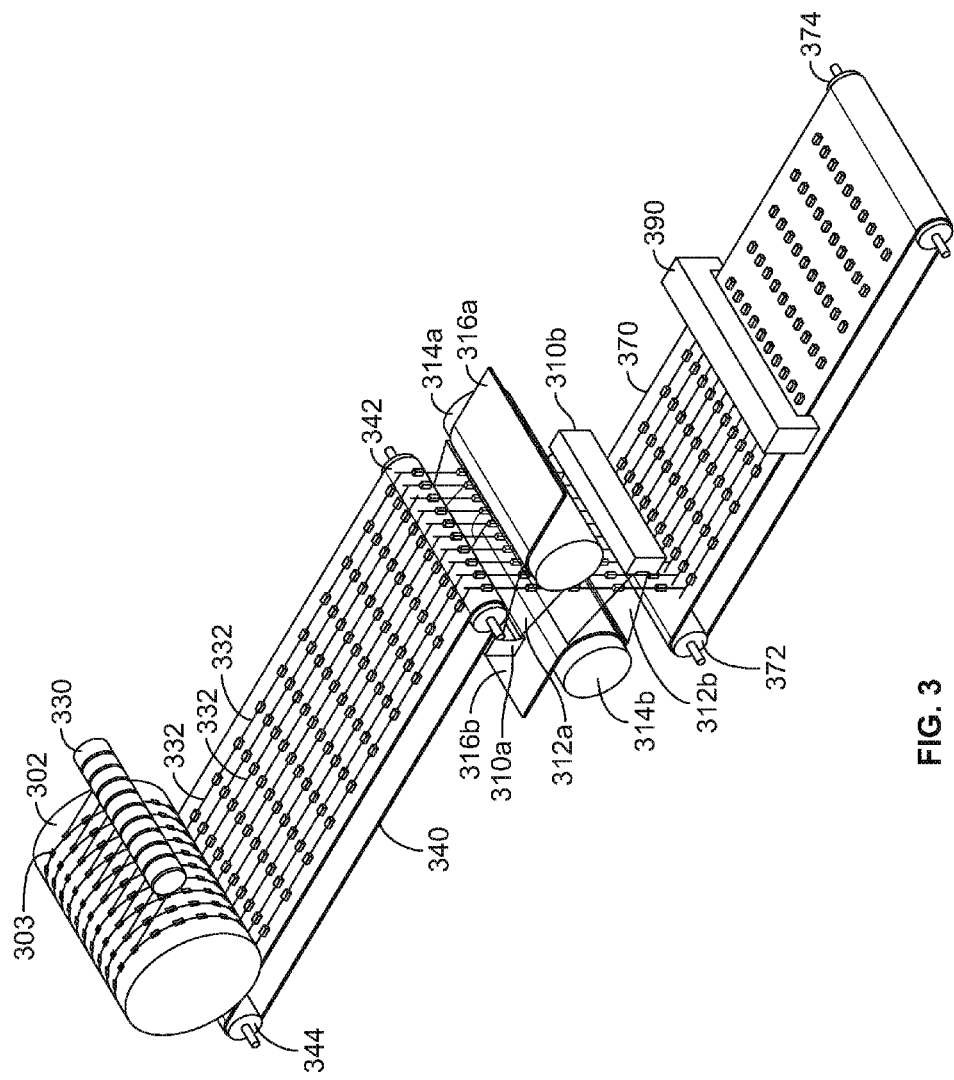
FIG. 3 depicts an exemplary embodiment of an apparatus provided herein forming product portions on string holding devices.

In some cases, the holding device can be a string. For example, FIG. 3 depicts an exemplary embodiment that includes string holding devices that each pass through a plurality of product portions. The string holding device can be made out of any suitable material. In some cases, the string holding device comprises cellulosic fibers, polymeric fibers, or a combination thereof. In some cases, one or more product portions are mounted on the string holding device by molding one or more product portions around the string holding device. In some cases, multiple product portions can be on a single string. In some cases, removing at least a portion of the string holding device is achieved by cutting the string to leave a portion of the string in the interior of the product portion.

FIG. 1 depicts a process flow diagram showing an example of how product portions 104 can be formed, mounted, enrobed, and separated. In step A, a molding device 102, including mold cavities corresponding to a shape of the product portions 104, can be used to mount product portions 104 in the cavities to holding device 120. For example, a mixture of smokeless tobacco can be compressed in a mold cavity between opposite pistons to form a body that can hold its shape when ejected from the mold cavities. In some cases, mold 102 can eject one or more product portions 104 onto holding device 120 such that one or more projections 122 penetrate into the body of each product portion 104. In some cases, projections 122 are needles. In step B, one or more projections 122 can be heated. Heating projections 122 can inhibit polymer build up on projections 122 during the process. In some cases, heating projections 122 can melt bond fibers on a product portion adjacent each projection. In some cases, one or more projections 122 are induction heated by an induction heater 130.

In step C, holding device 120 move product portions 104 into a polymer enrobing zone 112 produced by a polymer spray head 110. Polymer spray head 110 can produce any suitable stream of polymeric fibers using any suitable method. In some cases, polymer spray head 110 can be a melt-blowing apparatus. In some cases, polymer spray head 110 can be an electro spinning apparatus. In some cases, polymer spray head 110 can be a force-spinning apparatus. As holding device 120 moves product portions 104 through polymer enrobing zone 112, polymeric fibers begin to wrap around product portions 104 to create partially enrobed product portions 106. Holding device 120 can rotate each projection 122 (e.g., needle) using rotating each projection 122 using rotator 124. In some cases, holding device 120 can be rotated around a variety of axes. In some cases, holding device 120 can introduce product portions 104 into polymer enrobing zone 112 using multiple approaches. In some cases, holding device 120 can remove product portions 104 from polymer enrobing zone 112 using multiple departure angles. After enrobed product portions 108 are removed from the polymer enrobing zone 112, enrobed product portions 108 are separated from holding device 120 in Step D, where one or more enrobed product portions 108 can be collected and packaged. In Step E, holding device 120 can be returned to repeat the process. In some cases, step E can include cleaning steps prior to repeating Steps A-E. Accordingly, methods and machines provided herein can be automated and achieve consistent enrobed product properties.

FIG. 2A depicts an exemplary embodiment of an enrobing apparatus 200 for preforming the method depicted in FIG. 1. FIG. 2B depicts additional details of the holding device 220 in FIG. 2A. As shown in FIG. 2A, a robotic arm 260 is attached to a holding device 220. As shown, product portions 204 can be formed in mold 202, and collected by holding device 220 by inserting needles 222 into product portions 204. Robot arm 260 can move holding device 220 into polymer enrobing zone 212 along a plurality of axes. FIG. 2B depicts additional details about holding device 220. Holding device 220 includes an axis 229 that can be rotated by a robotic arm 260 to turn a plurality of needles 222 by engaging gears 228 using belts 226. Each needle 222 can be connected to a pedestal 224, which can include a thermal coupling to each needle 222 and/or a rotation mechanism. In some cases, apparatus 200 can include a controller adapted to move robot arm 260 along a desired path to achieve desired polymeric fiber coating thicknesses. As shown, partially enrobed product portions 206 are positioned in polymer enrobing zone 212 by robot arm 260. After the enrobing process is complete, robot arm 260 can move holding device 260 to a stripping device 282 including strippers 271, 272, 273, 274, and 275 that correspond to the spacing of the needles 222 of holding device 220. After being stripped, enrobed product portions can be collected in collection basket 284. Enrobed product portions can then be transported for packaging.

In some cases, duel needles 222 are configured to hold each product portion 204. Duel needles 222 can be used to allow for a controlled rotation of product portions 204 by moving holding device 220. In some cases, a single needle may simply rotate relative to a product portion instead of rotating the product portions, but two needles can be rotated to ensure a rotation of a product portion. Use of duel needles can also reduce a cross-sectional area of each holding device. In some cases, duel needles can have circular cross-sectional areas. In some cases, both single needles and duel needles can be used with non-circular cross-sectional areas.

In some cases, not shown, two needle-like devices can be pushed into opposite sides of a product portion to secure the product portion. The needle-like devices can be made of metal and have a sharp point. In some cases, a single dowel can be pressed through the entire body to hold the body. In some cases, the needle(s) or dowel(s) can have a diameter that is sufficiently small so as to prevent the passage of significant amounts of tobacco through the uncovered portion of the body created by the needle(s) and/or dowel(s).

FIG. 3 depicts an exemplary embodiment of an enrobing process including string holding devices 332. As shown, strings 332 can be unwound from reel 330 and positioned cavities 303 of rotary mold 302. In some cases, each cavity 303 can be prefilled material and subsequently squeezed by a roller to form a plurality of product portions of each string 332. In some cases, material for product portions is introduced to mold cavities 303 after string 332 and compressed in to product portions in cavities 303. Rotary mold 302 can include grooves to receiving and aligning strings 332. After product portions 304 are molded around strings 332, the strings and product portions can be advanced towards polymer enrobing zones 312a and 312b on conveyor 340 moving between roller 344 and 342. At a first polymer enrobing zone 312a, a first polymer spray head 310a directs polymeric fibers in a first direction to create a partially enrobed product portion 306, which then moves to a second polymer enrobing zone 312b that directs polymeric fibers in a direction opposite the first direction. Second polymer spray head 310b directs polymeric fibers in a direction opposite the first polymer spray head 310a in order to enrobe an opposite side. Stray polymeric fibers from each polymer spray head 310a and 310b can be collected on collection rollers 314a and 314b, and removed as a scrap sheet 316a or 316b.

In some cases, rotary mold 302 can mold two opposite halves of a product portion on a string 332. The two opposite halves can be centered or offset on a string. The two opposite halves can include different constituents. For example, in some cases, a smokeless tobacco product can include one half including long cut tobacco and a second half including fine cut tobacco. In some cases, each half can include a different flavor. After enrobing each half with polymeric fibers, the two opposite halves can be pressed and/or heat bonded together to create a duel material enrobed product portion, with or without removing string 332.

Enrobed product portions on strings 332 can be moved to a cutting device 390 by conveyor 370 moving on rollers 372 and 374. Cutting device 390 can cut the string adjacent to each side of each enrobed product portion. A segment of string can thus remain in enrobed product portion 308. String 332 can be made out of any suitable material. In some cases, string 332 is made out of a food grade material approved by an appropriate regulatory authority for oral and/or medical products. Suitable string materials include nylon, polyethylene, polypropylene, polyurethane, cotton yarn, nylon, rayon, polyesters, cellulosic fibers, and other food grade materials. In some cases, strings can be made of cellulosic fibers that can degrade and/or dissolve over time due to product moisture and/or use. In some cases, string 332 does not rotate. In some cases, string 332 can be rotated about its axis.

Polymer spray heads provided herein can provide any suitable supply of polymeric fibers using any suitable method to produce polymeric fibers. In some cases, polymer spray heads provided herein can be melt-blowing devices and product portions can be passed through a stream of melt-blown polymeric fibers to form an outer layer of melt-blown polymeric fibers around the product portions. In some cases, polymer spray heads provided herein can be force spinning devices and product portions can be passed through a stream of force-spun polymeric fibers to form an outer layer of force-spun polymeric fibers around the body. In some cases, polymeric structural fibers can be produced and contacted with product portions while the polymeric fibers are still above their melt temperature. In some cases, polymeric structural fibers can be cooled (e.g., quenched) prior to contacting or when fibers contact the product portion. In some cases, the polymeric structural fibers are treated with a surfactant and/or other additives to increase permittivity of the fiber wrapping. In some cases, the polymeric fibers can be hyper quenched during deposition.

In some cases, needle(s), string(s) and/or dowel(s) provided herein can have a diameter of less than 500 microns, less than 100 microns, less than 50 microns, or less than 10 microns. The holding devices can be used to control the speed of movement of the body through the polymer enrobing zone.

The holding devices can be heated. A heated needle and/or dowel can minimize build-up of excess fibers on the needle or dowel while the body is being wrapped with the polymeric fibers. For example, an electric heater can be applied to a metal needle by heating a portion of the needle being held. In some cases, holding devices can be heated by induction. In some cases, multiple holding devices can be used to rotate the bodies through the polymer enrobing zone along different axes. For example, two pairs of needles could be selectively engaged with a body to rotate a body about a first axis that is acute with the direction of the polymer flow followed by as second axis that is perpendicular to the first axis and acute with the direction of polymer flow. Other motion profiles are also possible. After a body is wrapped (e.g., enrobed), they can be ejected from the holding device(s). For example, a pair of needles can be moved apart to allow a body to drop. In some cases, a plate can slide over a surface of a holding device to eject the body.

Molding Product Portions

Referring back to FIG. 1, product portions can be molded in a molding device 102. In some cases, product portion is preformed or obtained in a desired size and/or shape. In some cases, as discussed above, product portion can include tobacco or other loose material. In order to mold product portions 104 out of loose material, the loose material can be added to a mixer. An optional binder, and optionally flavorants and/or other additives can be mixed with the tobacco and/or other loose material. For example, the loose material can be long cut tobacco having an oven volatiles content of 10-61 weight percent. Optional binder can be TICALOID LITE Powder. Optional flavorants and other additives can include, for example, a mint flavoring, a sweetener, and a pH modifier. The mixing step can occur in any commercially available countertop mixer or industrial mixer, for example a HOBART 40 lbs mixer or a FORBERG 250 lbs Paddle Mixer. In some cases, water can be added to the loose material (e.g., tobacco) prior to or during the mixing process to alter the total oven volatiles content of the final enrobed product portion. The oven volatiles content can also be modified by heating the mixture. In some cases, a commercially available smokeless tobacco product (e.g., SKOAL Long Cut) can be mixed with a binder (e.g., TICALOID LITE Powder) to form the mixture, which can then be shaped into one or more bodies.

In some cases, product portions provided herein can have less than 1% by weight of binder, less than 0.5% by weight of binder, less than 0.3% by weight of binder, less than 0.2% by weight of binder, less than 0.1% by weight of binder, or less than 0.05% by weight of binder. In some cases, smokeless tobacco bodies include one or more binders, such as a hydrocolloid, in an amount of between 0.05 weight percent and 0.8 weight percent. In some cases, the smokeless tobacco products include between 0.1 weight percent and 0.5 weight percent binder. For example, the preformed smokeless tobacco products can include between 0.2 and 0.4 weight percent of a binder that includes guar gum, xanthan gum, cellulose gum, or similar materials, or a combination thereof. In some cases, pre-hydrated Arabic gum can be used in product portions (e.g., smokeless tobacco products) to act as an emulsifier to increase/improve flavor immediacy.

Mixing can include depositing the mixture into a mold. In some cases, the mixture is deposited into an open mold plate including a plurality of identically shaped cavities, such as shown in FIG. 1. The molding step can include applying pressure to the mixture. The pressure can be applied as injection pressure applied to the mixture as it is forced into a closed cavity or by compressing each cavity filled with the mixture. The pressure used during the molding process impacts that amount of compression experienced by the mixture and thus the material properties of the mixture. In some cases, 50-300 lbs. of injection pressure is used to deliver the mixture into a plurality of mold cavities. The molds can be filled with continuous or intermittent pressure. A screw pump can be used to apply the pressure to the mixture. For example, a FORMAX® machine (e.g., the FORMAX F-6 and F-19 units) can be used to inject the mixture into cavities in a mold plate. For example, such a process is described in U.S. Patent Application Publication No. 2012/0024301, which is hereby incorporated by reference. In some cases, the mold cavities have shapes corresponding to the preformed product shapes shown in FIGS. 1B, 1C, and 4A-4N. In some cases, the mold cavities can have other shapes. In some cases, the mold cavities have a volume sized to create shaped smokeless tobacco bodies having a mass of, for example, about 2.35 grams. The edges and corners of the mold can be rounded to permit the shaped smokeless tobacco bodies to be easily released from the mold and be comfortable in the mouth of an adult tobacco consumer. In some cases, the molding step can include extruding smokeless tobacco material (optionally with binders, flavorants, and other additives) and cutting the extruded smokeless tobacco material to form the preformed bodies.

Polymer Enrobing Zone

Polymer enrobing zones provided herein can include a flow of polymeric fibers produced by any suitable polymer spray head. In some cases, multiple streams of polymeric fibers can be directed towards a product path along different directions. For example, a single melt-blowing device can have a bent or curved array of spinnerets so that melt-blown polymeric fibers converge towards a drop path. In some cases, multiple polymer fiber producing devices are arranged so that multiple streams converge towards a product path. In some cases, multiple polymer producing devices are arranged in series along a drop path directed in different directions (e.g., opposite directions). In some cases, a single product portion can be passed through one or more streams multiple times.

In some cases, an electrostatic charge can be applied to the bodies and/or the polymer during step. When electrostatically charged, a preformed body can draw fibers directly onto the body, which can increase the efficiency of the wrapping process and minimize polymeric fibers that bypass the body. An electrostatic charge can also improve the coverage around the back side of the preformed body. In some cases, a holding device (e.g., one or more needle-like structures pushed into the body) can be used to apply an electrostatic charge to the body. In some cases, the polymer is electrostatically charged (e.g., as the polymer passes through the spinnerets).

The fibers in polymer enrobing zone can be produced by melt-blowing and/or centrifugal force spinning, which are each described below. The polymer can be any suitable polymers usable in a melt-blowing and/or centrifugal force spinning process, such as polypropylene, polyurethane, cellulose, polyethylene, PVC, EVA (ethyl vinyl acetate), viscose, polyester, and PLA. Suitable polymeric materials for the fibers include one or more of the following polymer materials: acetals, acrylics such as polymethylmethacrylate and polyacrylonitrile, alkyds, polymer alloys, allyls such as diallyl phthalate and diallyl isophthalate, amines such as urea, formaldehyde, and melamine formaldehyde, epoxy, cellulosics such as cellulose acetate, cellulose triacetate, cellulose nitrate, ethyl cellulose, cellulose acetate, propionate, cellulose acetate butyrate, hydroxypropyl cellulose, hydroxypropyl methyl cellulose, carboxymethyl cellulose, cellophane and rayon, chlorinated polyether, coumarone-indene, epoxy, polybutenes, fluorocarbons such as PTFE, FEP, PFA, PCTFE, ECTFE, ETFE, PVDF, and PVF, furan, hydrocarbon resins, nitrile resins, polyaryl ether, polyaryl sulfone, phenol-aralkyl, phenolic, polyamide (nylon), poly (amide-imide), polyaryl ether, polycarbonate, polyesters such as aromatic polyesters, thermoplastic polyester, PBT, PTMT, (polyethylene terephthalate) PET and unsaturated polyesters such as SMC and BMC, thermoplastic polyimide, polymethyl pentene, polyolefins such as LDPE, LLDPE, HDPE, and UHMWPE, polypropylene, ionomers such as PD and poly allomers, polyphenylene oxide, polyphenylene sulfide, polyurethanes (such as DESMOPAN DP 9370A available from Bayer), poly p xylylene, silicones such as silicone fluids and elastomers, rigid silicones, styrenes such as PS, ADS, SAN, styrene butadiene latricies, and styrene based polymers, suflones such as polysulfone, polyether sulfone and polyphenyl sulfones, polymeric elastomers, and vinyls such as PVC, polyvinyl acetate, ethyl vinyl acetate, polyvinylidene chloride, polyvinyl alcohol, polyvinyl butyrate, polyvinyl formal, propylene-vinyl chloride copolymer, ethylvinyl acetate, and polyvinyl carbazole, polyvinyl pyrrolidone, and polyethylene oxide, ethylene vinyl alcohol, sugar alcohols, and starches. In some cases, a blend of polyurethane, polypropylene, and styrene can be compounded and used to make polymeric fibers in methods and machines provided herein.

The melt-blown and/or centrifugal force spun polymeric fibers can be quenched (i.e., rapidly cooled to below their melt temperature) prior to or upon contacting the product portions. For example, water or other liquid can be sprayed into a polymeric fiber stream prior to contact with a product portion to quench the polymeric fibers. In some cases, the polymeric fibers can be quenched with a surfactant. In some cases, the polymeric fibers can be cooled to below the melt temperature after contact with one or more product portions.

The polymeric fibers can have a diameter of less than 100 microns, less than 50 microns, less than 30 microns, less that 10 microns, less than 5 microns, less than 1 microns, less that 0.5 microns, less than 0.1 microns, less than 0.05 microns, or less than 0.01 microns. In some cases, melt-blown polymeric fibers can have a diameter of between 0.5 and 5 microns. In some case, force-spun polymeric fibers can have a diameter of between 10 nanometers and 1 micron. The flow of the polymeric fibers and the dimensions of the polymeric fibers as they exit a melt blowing or centrifugal force spinning apparatus result in an intimate contact between the fibers and the product portions such that the polymeric fibers conform to the surface topography of the fibrous tobacco structures.

Collecting and Packaging

A collecting and packaging step can include catching the enrobed product portions and packaging them in package (e.g., container). For example, fiber-wrapped smokeless tobacco products can be collected on a conveyor belt and transported to a position device that places a plurality of products in a container. After being placed in the interior space of a container, a lid can be mated with the connection rim of the bottom container. A label can be applied to the closed container system (e.g., applied to the outer cylindrical sidewalls of the bottom container and the lid). Shrink wrap can also be applied to the closed container system. A plurality of filled, labeled, and shrink wrapped container systems can then be placed in a box and shipped to a retail location.

For example, fiber-wrapped smokeless tobacco products described herein can experience significant jarring movements during the landing after the drop, during sorting and placing the formed shaped smokeless tobacco bodies into a container, closing, labeling, shrink wrapping, and bulk packaging the container, shipping containers to retail locations, stocking the containers at a retail location, and having an adult tobacco consumer purchase and carry around the container. Fiber-wrapped smokeless tobacco products provided herein, however, can retain their structural integrity due to the fiber wrapping.

Melt-Blowing Processes

Figure 4:
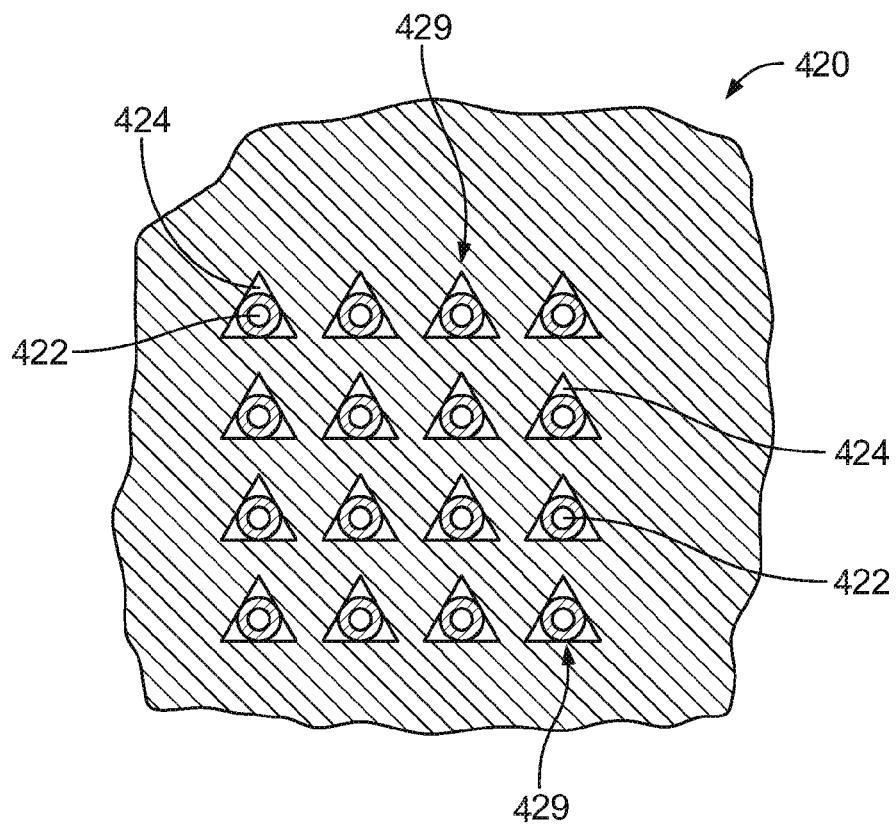
FIG. 4 depicts an exemplary arrangement of polymer orifices and air orifices for a melt-blowing apparatus.

Polymer spray heads 110, 210, and 310 can, in some cases, be melt-blowing devices adapted to produce a plurality of polymeric fibers. Melt-blowing is an extrusion process where molten polymeric resins are extruded through an extrusion die (e.g., a spinneret) and gas is introduced to draw the filaments to produce polymeric fibers. The gas can be heated air blown at high velocity through orifices that surround each spinneret or in air slots around each individual spinneret. In some cases, layers of hot air are blown through slots between rows of spinnerets—the strands of polymeric material are attenuated by being trapped between two layers of air. Other methods of delivering the attenuating gas (e.g., heated air) are possible. FIG. 4 depicts an exemplary arrangement of polymer orifices and air orifices for melt-blowing devices 420. Other melt-blowing devices are described in U.S. Pat. Nos. 4,380,570; 5,476,616; 5,645,790; and 6,013,223, and in U.S. Patent Applications US 2004/0209540; US 2005/0056956; US 2009/0256277; US 2009/0258099; and US 2009/0258562, which are hereby incorporated by reference.

A melt-blowing device 420 can include a polymer extruder that pushes molten polymer at low or high melt viscosities through a plurality of polymer orifices 422. The melt-blowing device 420 includes one or more heating devices that heat the polymer as it travels through the melt-blowing device 140 to ensure that the polymer remains above its melting point and at a desired melt-blowing temperature. As the molten polymer material exits the polymer orifice 422, the polymer material is accelerated to near sonic velocity by gas being blown in parallel flow through one or more air orifices 424. The air orifices 424 can be adjacent to the polymer orifices 422. The air orifices 424 may surround each polymer orifice 422. In some cases, the air orifices 424 can be rounded. Each combination of a polymer orifice 422 with surrounding air orifices 424 is called a spinneret 429. For example, the melt-blowing device 420 can have between 10 and 500 spinnerets 429 per square inch. The polymer orifices 422 and the gas velocity through gas orifices 424 can be combined to form fibers of 100 microns or less. In some cases, the spinnerets each have a polymer orifice diameter of 30 microns or less. In some cases, the fibers have diameters of between 0.5 microns and 5 microns. The factors that affect fiber diameter include throughput, melt temperature, air temperature, air pressure, spinneret design, material, distance from the drum, spinneret design, and material being processed. In some cases, the spinnerets 429 each have a polymer orifice diameter of less than 900 microns. In some cases, the spinnerets 429 each have a polymer orifice diameter of at least 75 microns. The average polymer orifice diameter can range from 75 microns to 1800 microns. In some cases, the average polymer orifice diameter can be between 150 microns and 400 microns. In some cases, polymer orifice diameters of about 180 microns, about 230 microns, about 280 microns, or about 380 microns are used. In some cases, some spinnerets can also include orifices that provide air flows without polymer to provide additional attenuation and direction of polymer fibers produced from other spinnerets.

Electro Spinning Systems

Electro spinning is a process that spins fibers of diameters ranging from 10 nm to several hundred nanometers; typically polymers are dissolved in water or organic solvents. The process makes use of electrostatic and mechanical force to spin fibers from the tip of a fine orifice or spinneret. The spinneret is maintained at positive or negative charge by a DC power supply. When the electrostatic repelling force overcomes the surface tension force of the polymer solution, the liquid spills out of the spinneret and forms an extremely fine continuous filament. These filaments are collected onto a rotating or stationary collector with an electrode beneath of the opposite charge to that of the spinneret where they accumulate and bond together to form nanofiber web.

Centrifugal Force Spinning Processes

Figure 5A:
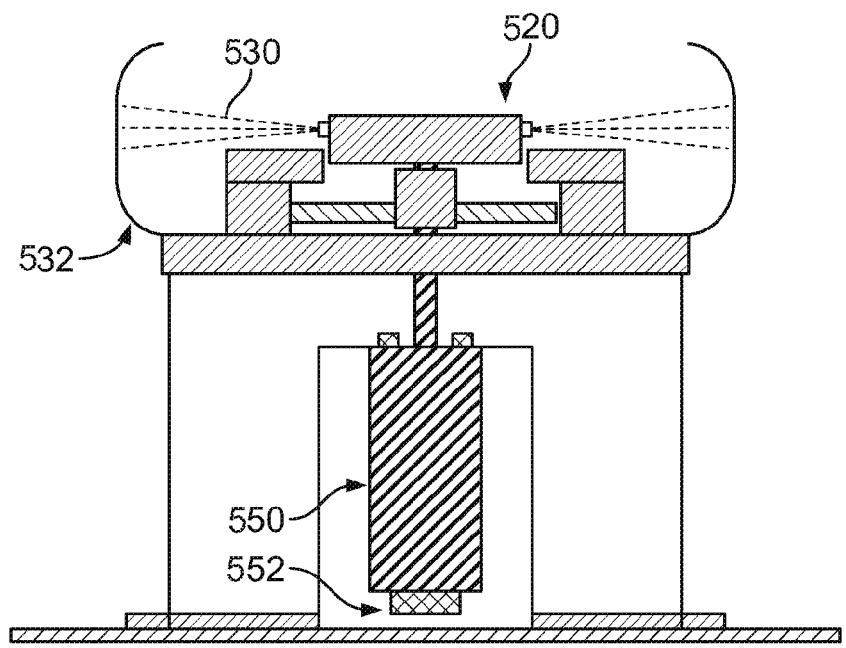
FIGS. 5A-5E illustrates a force-spinning apparatus.
Figure 5B:
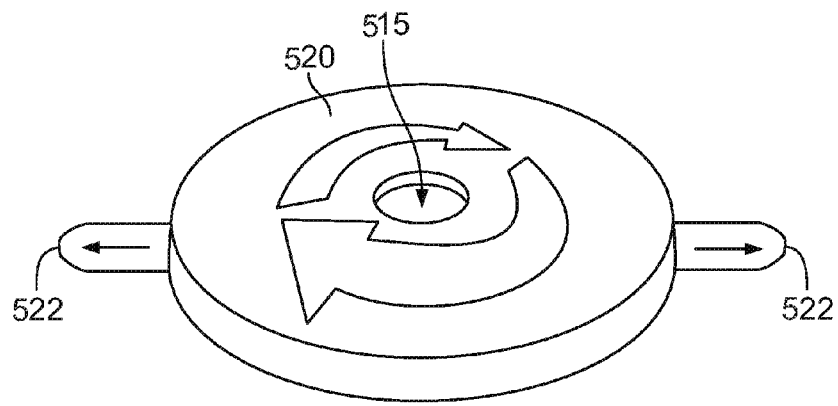
Figure 5C:
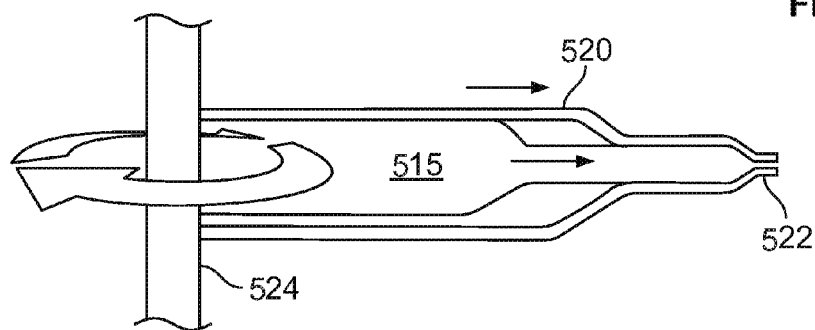
Figure 5D:
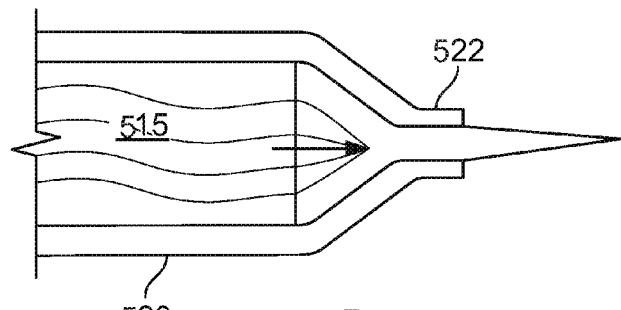
Figure 5E:
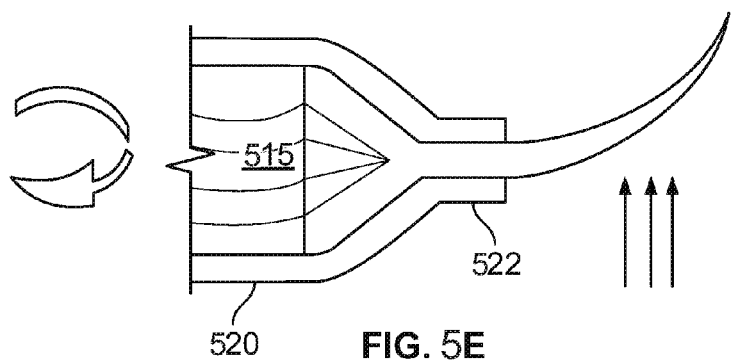

Centrifugal force spinning is a process where centrifugal force is used to create and orient polymeric fibers. FIGS. 5A-5E depict an exemplary centrifugal force spinning apparatus. As shown, a spinneret 520 holds polymeric material 515 and is rotated at high speeds with a motor 550 to produce polymeric fibers 530 that are deposited onto a fiber collector 532. FIG. 5B depicts a close-up of the spinneret 520 showing two orifices 522. Any number of orifices 522 can be used. The fiber collector 532 can be a continuous drum or a series of spaced collection fingers. As the spinneret 520 rotates, the polymeric material (in a liquid state) is pushed to the orifices 522 lining the outer wall of the spinneret 520. As the polymeric material enters the orifice chamber, molecules disentangle and then align directionally. Centrifugal and hydrostatic forces combine to initiate a liquid material jet. The external aerodynamic environment combined with the inertial force of continued rotation further applies shear forces and promote cooling and/or solvent evaporation to further stretch the fiber. The inertia force can stretch molecular chains into the nanoscale and the air turbulence can apply a shear force. Product portions can be passed through the streams of centrifugal force spun polymer by using holding devices provided herein to move and/or rotate one or more product portions within polymer enrobing zone (e.g., in a collection drum 532). In some cases, centrifugal force spun fibers can improve a web strength and random orientation of polymeric fibers deposited onto a product portion due to a long fiber length.

Polymeric Fibers

Polymeric fibers produced and used in and by methods, products, and machines provided herein can be made of any suitable material by any suitable method. In some cases, polymeric fibers from polymer spray heads discussed herein can be produced by melt-blowing, electro spinning, and/or centrifugal force spinning, which are each described above. The polymer can be any suitable polymers usable in a melt-blowing, electro spinning, and/or centrifugal force spinning process, such as polypropylene, polyurethane, styrene, cellulose, polyethylene, PVC, viscose, polyester, and PLA. In some cases, polymeric fibers can be quenched (i.e., rapidly cooled to below their melt temperature) prior to or upon contacting product portions 220. For example, water or other liquid can be sprayed into a polymeric fiber stream as it exits the polymer spray head. In some cases, the polymeric fibers can be quenched with a surfactant. In some cases, the polymeric fibers can be cooled to below the melt temperature after contact with product portions.

In some cases, the polymeric fibers are mouth-stable fibers. The mouth-stable fibers can have low extractables, are approved for use with food, and/or be manufactured by suppliers who are GMP approved. Highly desirable are materials that are easy to process and relatively easy to approve for oral use (e.g. quality, low extractables, approved by regulators, suppliers are GMP approved). In some cases, the mouth-stable structural fibers are elastomers. Elastomers can provide webs with improved elongation and toughness. Suitable elastomers include VISTAMAX (ExxonMobil), TEXIN RXT70A (Bayer), and MD-6717 (Kraton). In some cases, elastomers can be combined with polyolefins at ratios ranging from 1:9 to 9:1. For example, elastomers (such as VISTAMAX or MD-6717) can be combined with polypropylene.

In some cases, polymeric fibers used by methods, machines, and products provided herein include elastomeric polymers (e.g., polyurethane). Elastomeric polymers can provide webs with improved elongation and toughness. In some cases, an elastomeric polymer smokeless tobacco product portion provided herein can provide the unique property of allowing an adult tobacco consumer to reduce or increase a packing density of the elastomeric polymer smokeless tobacco product portion, which can impact a rate of flavor release. A higher packing density can reduce a rate of flavor release. In some cases, polymeric fibers used in methods and machines provided herein can be hydrophilic, which can provide a moist appearance and/or provide superior flavor release. Suitable elastomeric polymers include EPAMOULD (Epaflex), EPALINE (Epaflex), TEXIN (Bayer), DESMOPAN (Bayer), HYDROPHAN (Advance-Sourse Biomaterials), ESTANE (Lubrizol), PELLETHANE (Lubrizol), PEARLTHANE (Merquinsa), IROGRAN (Huntsman), ISOTHANE (Greco), ZYTHANE (Alliance Polymers and Services), VISTAMAX (ExxonMobil), and MD-6717 (Kraton). In some cases, elastomers can be combined with polyolefins at ratios ranging from 1:9 to 9:1. For example, elastomeric polymers can be combined with polypropylene.

Figure 7:
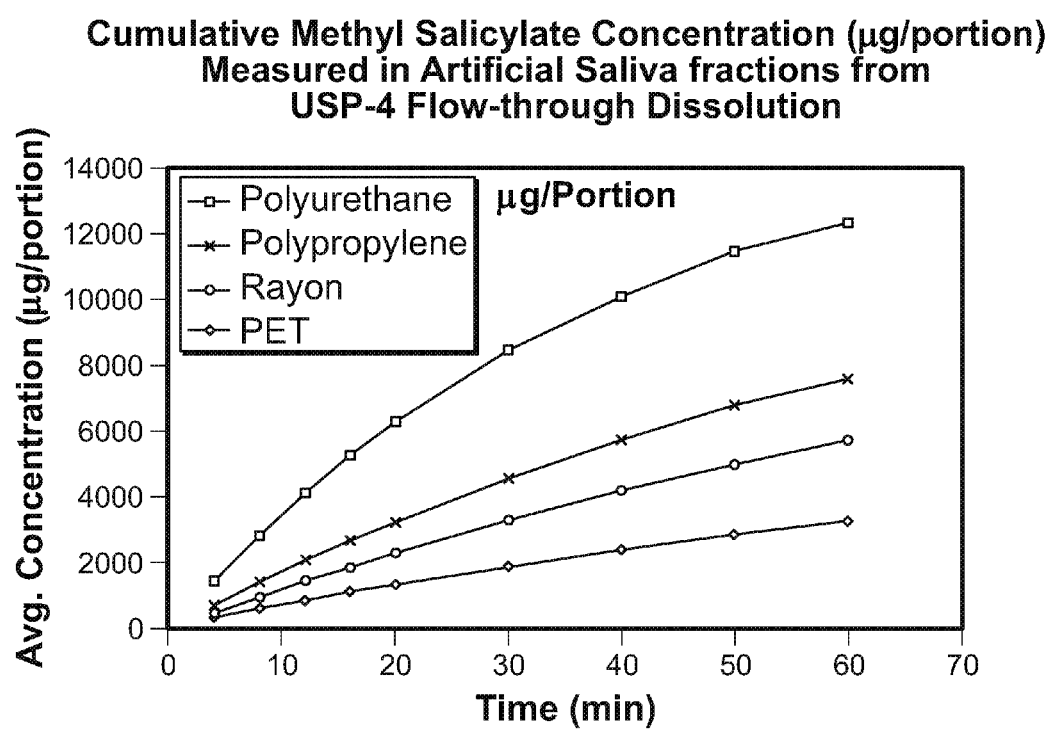
FIG. 7 depicts a chart comparing release rates of methyl sallylate from pouches made of different materials.

Hydrophilic materials can wick fluids there through and/or give a pouched product a moist appearance. For example, polyurethane polymer fibers can also provide faster and higher cumulative flavor release as compared to non-elastic polymer fiber such as rayon, polypropylene, and polyethylene terephthalate (PET). FIG. 7 depicts the cumulative methyl sallcylate concentration (µg/portion) measured in artificial saliva fractions from USP-4 flow-through dissolution pouches made of polyurethane, polypropylene, rayon, and PET. Due to polyurethanes relatively high level of elasticity and natural hydrophilic properties, flavor is able to traverse polyurethane pouching material easier than non-elastomeric nonwoven substrates.

Mouth-dissolvable fibers could be made from hydroxypropyl cellulose (HPC), methyl hydroxypropyl cellulose (HPMC), polyvinyl alcohol (PVOH), PVP, polyethylene oxide (PEO), starch and others. These fibers could contain flavors, sweeteners, milled tobacco, and other functional ingredients. The fibers can, in some cases, be formed by extrusion or by solvent processes. In some cases, mouth dissolvable fibers can be combined with mouth-stable fibers to wrap the bodies as provided herein. For example, alternating layers of mouth dissolvable fibers and mouth-stable fibers can be deposited on a body.

Colorants and/or fillers can also be added to the polymer in melt-blowing device provided herein. The hydraulic permittivity of the fabric can also be increased by compounding the polymer with a filler prior to melt-blowing the polymeric material. The hydraulic permittivity is the rate of fluid transfer through a substrate. In some cases, a colorant can be used as the filler. For example, a brown colorant can be added to a feed hopper of the extruder along with a polymer material (e.g., polypropylene) prior to melt-blowing the polymer into the fibers. In addition to improving the hydraulic permittivity, the colorant can improve the aesthetic appeal of the fiber-wrapped smokeless tobacco product. For example, a brown colorant can make a wrapped moist-smokeless tobacco product appear moist. The colorant and the polymer can be compounded and pelletized prior to melt-blowing the polymer to ensure a consistent ratio of colorant to polymer. In some cases, the colorant can be a liquid and can be injected into the polymeric material.

In some cases, the filler can include milled tobacco material. For example, milled tobacco could be combined into a polymeric structural fiber such that the polymeric material at least partially encapsulates the milled tobacco. For example, milled tobacco could be added to a molten polymer (e.g., polypropylene) in amounts of up to about 80% and extruded in a melt-blowing or centrifugal force spinning process. The milled tobacco can provide a unique texture or consumer experience while the polymeric material remains mouth-stable and cohesive.

As discussed above, the polymeric fibers can contact product portions at a temperature greater than the melt temperature of the polymer. In some cases, however, the polymeric fibers can be quenched and/or treated with a surfactant prior to contacting product portions. Water vapor can be used to cool the polymeric material. For example, atomized water from a spout can be directed into the stream of molten strands of polymeric material to "quench" the polymeric strands and form the fibers. For example, a mist can be aimed towards the spinnerets 429 of the melt-blowing device 420. A fine mist of water vapor, surfactant, or air can quickly cool the strands below the polymer melt temperature. In some cases, quenched melt-blown fibers can have improved softness and fiber/web tensile strength.

A surfactant treatment can also be applied to the fibers. In some cases, a surfactant is applied to the polymeric fibers as they exit the spinnerets 429 of the melt-blowing device 420 or the orifices 522 of the centrifugal force spinning spinneret 520. In some cases, surfactant can be applied as a mist (either with or without water). In some cases, the surfactant applied as a mist can quench the polymeric fibers. In some cases, the surfactant can be applied in an extrusion process. In some cases, a mixture of water and surfactant can be atomized and applied as a mist. Sweeteners and/or flavorants can also be atomized and applied to the polymeric fibers in mist, which can also be used to quench the polymeric fibers.

Quenching the polymer can modify the crystallinity of the polymer material to improve tensile strength and mouth feel. The surfactant can improve the hydraulic permittivity of the fiber wrap to improve moisture and flavor release from the product. The hydraulic permittivity is the rate of fluid transfer through a substrate.

The tensile integrity of the wrapped fiber can also be improved by bonding fibers together. In some cases, the wrapped fiber can be heat bonded at intersection points. The heating of the polymeric material to a temperature above its melt temperature can be accomplished by using electrically heated surfaces, ultrasonic bonding, infrared energy, radio frequency energy, microwave energy, laser, and/or needle punching. Stitch bonding, point bonding, and quilting are methods of applying patterns to nonwoven fabrics. These are forms of thermal bonding typically achieved with ultrasonic bonding processes, although other energy sources and related equipment can be used to create particular patterns of bonding within the network of fibers.

Smokeless Tobacco Product Portions

Fiber-wrapped smokeless tobacco products made using the methods and machines provided herein can provide a smokeless tobacco product that can remain intact when used by an adult tobacco consumer, yet provide a satisfying tobacco flavor and tactile experience. In some cases, polymeric fibers have a diameter of less than 100 microns and are deposited onto a body including smokeless tobacco held by the holding devices provided herein. The polymeric fibers can wrap around the body and form a moisture-permeable porous surface. In particular, the polymeric fibers can provide a smooth mouth texture, bind/encase/encapsulate the smokeless tobacco during use, but give the adult tobacco consumer good access to the smokeless tobacco and any flavor contained therein. As compared to a typical pouch paper (e.g., as shown in FIG. 7), the polymeric fibers can be softer, be free of seams, have a lower basis weight, act as less of a selective membrane, be chewable, and greater moldability/manageability. Methods and machines described herein result in products that remain cohesive and are less likely to break apart during packaging, handling, shipping, and during use by adult tobacco consumers. Methods and machines described herein can enrobe and/or wrap smokeless tobaccos that are not suitable for being pouched using a typical pouching operation, for example smokeless tobaccos having an average aspect ratio of greater than 3 (e.g., long-cut smokeless tobacco) and/or high moisture tobacco (e.g., a tobacco having an OV content of greater than 47 weight percent).

The described combinations of the polymeric material and smokeless tobacco can provide a softer mouth feel. Moreover, in some cases, the polymeric material can be elastic or pliable (e.g., a polymeric polyurethane such as DESMOPAN DP 9370A or TEXIN available from Bayer), thus forming a smokeless tobacco product that can tolerate being "worked" (e.g., chewed or squeezed) in the mouth without the tobacco dispersing within the mouth. For example, the smokeless tobacco product can be worked to provide flavor and/or to comfortably conform between the cheek and gum. In some cases, combinations of mouth-stable and mouth-dissolvable polymeric materials are combined with a body including smokeless tobacco material to provide a product that becomes looser after being placed in a mouth of an adult tobacco consumer, yet remains generally cohesive. Polymeric structural fibers can also be a composite of multiple materials, which may include both mouth-stable and mouth-dissolvable materials.

The fiber-wrapped smokeless tobacco product can also be dimensionally stable. As used herein, "dimensionally stable" means that the fiber-wrapped smokeless tobacco product retains its shape under its own weight. In some cases, a fiber-wrapped smokeless tobacco product is flexible, yet can be picked up at one end without the force of gravity causing the fiber-wrapped smokeless tobacco product to bend or sag. In some cases, the fiber-wrapped smokeless tobacco product can be easily deformable. In some cases, enrobed product portions produced in methods and/or machines provided herein can be rewet with water and/or a solution of flavorants, sweeteners, and/or other additives discussed herein to wick the coating of polymeric fibers, provide a moist appearance, prove a flavor immediately, and/or to increase a flavor intensity.

Tobacco

Smokeless tobacco is tobacco suitable for use in an orally used tobacco product. By "smokeless tobacco" it is meant a part, e.g., leaves, and stems, of a member of the genus *Nicotiana* that has been processed. Exemplary species of tobacco include *N. rustica, N. tabacum, N. tomentosiformis*, and *N. sylvestris*. Suitable tobaccos include fermented and unfermented tobaccos. In addition to fermentation, the tobacco can also be processed using other techniques. For example, tobacco can be processed by heat treatment (e.g., cooking, steam treating, toasting), flavoring, enzyme treatment, expansion and/or curing. For example, tobacco can be conditioned by heating, sweating and/or pasteurizing steps as described in U.S. Publication Nos. 2004/0118422 or 2005/0178398. Both fermented and non-fermented tobaccos can be processed using these techniques. In some cases, the tobacco can be unprocessed tobacco. Specific examples of suitable processed tobaccos include dark air-cured, dark fire-cured, burley, flue cured, and cigar filler or wrapper, as well as the products from the whole leaf stemming operation. In some cases, smokeless tobacco includes up to 70% dark tobacco on a fresh weight basis. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change the color, texture, taste, and sensorial attributes of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented tobacco can be further processed (e.g., cut, expanded, blended, milled, or comminuted) prior to incorporation into the smokeless tobacco product. The tobacco, in some cases, is long cut fermented cured moist tobacco having an oven volatiles content of between 10 and 61 weight percent prior to mixing with the polymeric material and optionally flavorants and other additives.

The tobacco can, in some cases, be prepared from plants having less than 20 µg of DVT per cm$^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

The smokeless tobacco can be processed to a desired size. For example, long cut smokeless tobacco typically is cut or shredded into widths of about 10 cuts/inch up to about 110 cuts/inch and lengths of about 0.1 inches up to about 1 inch. Double cut smokeless tobacco can have a range of particle sizes such that about 70% of the double cut smokeless tobacco falls between the mesh sizes of −20 mesh and 80 mesh. Other lengths and size distributions are also contemplated.

The smokeless tobacco can have a total oven volatiles content of about 10% by weight or greater; about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight. Those of skill in the art will appreciate that "moist" smokeless tobacco typically refers to tobacco that has an oven volatiles content of between about 40% by weight and about 60% by weight (e.g., about 45% by weight to about 55% by weight, or about 50% by weight). As used herein, "oven volatiles" are determined by calculating the percentage of weight loss for a sample after drying the sample in a pre-warmed forced draft oven at 110 degrees C. for 3.25 hours. The fiber-wrapped smokeless tobacco product can have a different overall oven volatiles content than the oven volatiles content of the smokeless tobacco used to make the fiber-wrapped smokeless tobacco product. The processing steps described herein can reduce or increase the oven volatiles content. The overall oven volatiles content of the fiber-wrapped smokeless tobacco product is discussed below.

The fiber-wrapped smokeless tobacco product can include between 15 weight percent and 85 weight percent smokeless tobacco on a dry weight basis. The amount of smokeless tobacco in a fiber-wrapped smokeless tobacco product on a dry weight basis is calculated after drying the fiber-wrapped smokeless tobacco product in a pre-warmed forced draft oven at 110 degrees C. for 3.25 hours. The remaining non-volatile material is then separated into tobacco material and polymeric material. The percent smokeless tobacco in the fiber-wrapped smokeless tobacco product is calculated as the weight smokeless tobacco divided by the total weight of the non-volatile materials. In some cases, the fiber-wrapped smokeless tobacco product includes between 20 weight percent and 60 weight percent tobacco on a dry weight basis. In some cases, the fiber-wrapped smokeless tobacco product includes at least 28 weight percent tobacco on a dry weight basis. For example, a fiber-wrapped smokeless tobacco product can include a total oven volatiles content of about 57 weight percent, about 3 weight percent polymeric material, and about 40 weight percent smokeless tobacco on a dry weight basis.

In some cases, a plant material other than tobacco is used as a tobacco substitute in the fiber-wrapped smokeless tobacco product. The tobacco substitute can be an herbal composition. Herbs and other edible plants can be categorized generally as culinary herbs (e.g., thyme, lavender, rosemary, coriander, dill, mint, peppermint) and medicinal herbs (e.g., Dahlias, Cinchona, Foxglove, Meadowsweet, Echinacea, Elderberry, Willow bark). In some cases, the tobacco is replaced with a mixture of non-tobacco plant material. Such non-tobacco compositions may have a number of different primary ingredients, including but not limited to, tea leaves, coffee, red clover, coconut flakes, mint leaves, ginseng, apple, corn silk, grape leaf, and basil leaf. The plant material typically has a total oven volatiles content of about 10% by weight or greater; e.g., about 20% by weight or greater; about 40% by weight or greater; about 15% by weight to about 25% by weight; about 20% by weight to about 30% by weight; about 30% by weight to about 50% by weight; about 45% by weight to about 65% by weight; or about 50% by weight to about 60% by weight.

Binders

Binders can optionally be used to bind together smokeless tobacco material to form a body, which can then be encased or wrapped with polymeric fibers. Binders suitable for use in the fiber-wrapped smokeless tobacco product provided herein include orally compatible polymers, such as cellulosics (e.g., carboxymethyl cellulose (CMC), hydroxypropyl cellulose (HPC), hydroxyethyl cellulose (HEC), hydroxypropyl methyl cellulose (HPMC), and methyl cellulose (MC)); natural polymers (e.g., starches and modified starches, konjac, collagen, inulin, soy protein, whey protein, casein, and wheat gluten); seaweed-derived polymers (e.g., carrageenan (kappa, iota, and lambda); alginates, (and propylene glycol alginate), microbial-derived polymers (e.g., xanthan, dextrin, pullulan, curdlan, and gellan); extracts (e.g., locust bean gum, guar gum, tara gum, gum tragacanth, pectin (lo methoxy and amidated), agar, zein, karaya, gelatin, psyllium seed, chitin, and chitosan), exudates (e.g., gum acacia (arabic) and shellac), synthetic polymers (e.g., polyvinyl pyrrolidone, polyethylene oxide, and polyvinyl alcohol).

The binder, in some cases, is guar gum, xanthan, cellulose, or a combination thereof. The cellulose can be carboxymethyl cellulose (CMC). Guar gum, xanthan, CMC, and some combinations thereof can be obtained from, for example, TIC Gums Inc., located in White Marsh, Md. and at www.ticgums.com. Guar gum is sold by TIC Gums Inc. under the trade name GUARNT. Carboxymethyl cellulose (CMC) is sold by TIC Gums Inc. under the trade name TICALOSE. Xanthan is sold by TIC Gums Inc. under the trade name TICAXAN. TIC Gums Inc. also sells some mixed binders, such as the mixed binder systems sold under the trade names TICALOID and TICAFILM. In some cases, TICALOID LITE Powder is used as the binder in the preformed smokeless tobacco products.

The binder can be present in amounts that allow the fiber-wrapped smokeless tobacco product to remain cohesive during a pass through a polymer enrobing zone. In some cases, the fiber-wrapped smokeless tobacco product includes at least 0.05 weight percent binder. The fiber-wrapped smokeless tobacco product has, in some cases, less than 5.0 weight percent binder. The fiber-wrapped smokeless tobacco product has, in some cases, less than 1.0 weight percent binder. In some cases, the binder of each fiber-wrapped smokeless tobacco product is between 0.05 and 0.5 weight percent of the preformed smokeless tobacco product. The binder of each fiber-wrapped smokeless tobacco product can also be in an amount of between 0.1 and 0.4 weight percent. In some cases, a fiber-wrapped smokeless tobacco product made by methods or machines provided herein can be substantially free of binders.

Flavorants and Additives

Flavors and other additives can be included in the compositions and arrangements described herein and can be added to the fiber-wrapped smokeless tobacco products at any point in the process of making the fiber-wrapped smokeless tobacco products. For example, any of the initial components, including the polymeric material, can be provided in a flavored form. In some cases, flavorants and/or other additives are included in the smokeless tobacco. In some cases, flavorants and/or other additives are absorbed into to the smokeless tobacco product after the polymeric material and the tobacco are combined. In some cases, flavorants and/or other additives are sprayed onto a stream as part of a quenching and/or surfactant mist. Alternatively or additionally, flavor can be applied prior to being further processed (e.g., cut or punched into shapes) or flavor can be applied prior to packaging.

Suitable flavorants include wintergreen (e.g., methyl salicylate), cherry and berry type flavorants, various liqueurs and liquors such as Drambuie, bourbon, scotch, whiskey, spearmint, peppermint, lavender, cinnamon, cardamon, *apium graveolens*, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ilangilang, sage, fennel, piment, ginger, anise, coriander, coffee, liquorish, and mint oils from a species of the genus *Mentha*. Mint oils used in some cases of the fiber-wrapped smokeless tobacco products include spearmint and peppermint.

Flavorants can also be included in the form of flavor beads (e.g., flavor capsules, flavored starch beads, flavored gelatin beads), which can be dispersed within the fiber-wrapped smokeless tobacco product (e.g., in a nonwoven network of polymeric structural fibers). For example, the fiber-wrapped smokeless tobacco product could include the beads described in U.S. Patent Application Publication 2010/0170522, which is hereby incorporated by reference.

In some cases, the amount of flavorants in the fiber-wrapped smokeless tobacco product is limited to less than 10 weight percent in sum. In some cases, the amount of flavorants in the fiber-wrapped smokeless tobacco product is limited to be less than 5 weight percent in sum. For example, certain flavorants can be included in the fiber-wrapped smokeless tobacco product in amounts of about 3 weight percent.

Other optional additives include as fillers (e.g., starch, di-calcium phosphate, lactose, sorbitol, mannitol, and microcrystalline cellulose), soluble fiber (e.g., Fibersol from Matsushita), calcium carbonate, dicalcium phosphate, calcium sulfate, and clays), lubricants (e.g., lecithin, stearic acid, hydrogenated vegetable oil, canola oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), plasticizers (e.g., glycerine), propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), pH stabilizers, salt, or other compounds (e.g., vegetable oils, surfactants, and preservatives). Some compounds display functional attributes that fall into more than one of these categories. For example, propylene glycol can act as both a plasticizer and a lubricant and sorbitol can act as both a filler and a plasticizer. As noted above, fillers or colorants can be added to the polymer prior to melt-blowing the polymer in order to increase the permittivity of the wrapped fibers.

Oven volatiles, such as water, may also be added to the fiber-wrapped smokeless tobacco product to bring the oven volatiles content of the fiber-wrapped smokeless tobacco product into a desired range. In some cases, flavorants and other additives are included in a hydrating liquid.

Oven Volatiles

The fiber-wrapped smokeless tobacco product can have a total oven volatiles content of between 10 and 61 weight percent. In some cases, the total oven volatiles content is at least 40 weight percent. The oven volatiles include water and other volatile compounds, which can be a part of the tobacco, the polymeric material, the flavorants, and/or other additives. As used herein, the "oven volatiles" are determined by calculating the percentage of weight loss for a sample after drying the sample in a pre-warmed forced draft oven at 110 degrees C. for 3.25 hours. Some of the processes may reduce the oven volatiles content (e.g., heating the composite or contacting the smokeless tobacco with a heated polymeric material), but the processes can be controlled to have an overall oven volatiles content in a desired range. For example, water and/or other volatiles can be added back to the fiber-wrapped smokeless tobacco product to bring the oven volatiles content into a desired range. In some cases, the oven volatiles content of the fiber-wrapped smokeless tobacco product is between 4 and 61 weight percent. In some cases, the oven volatiles content of the fiber-wrapped smokeless tobacco product is between 47 and 61 weight percent. For example, the oven volatiles content of smokeless tobacco used in the various processed described herein can be about 57 weight percent. In some cases, the oven volatiles content can be between 10 and 30 weight percent.

Product Configurations

Figure 6:
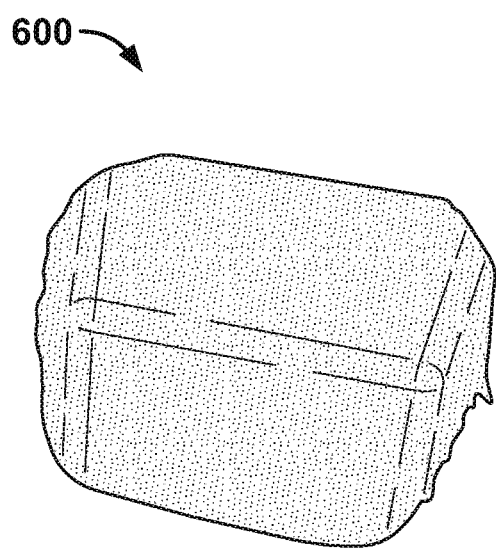
FIG. 6 depicts an exemplary fiber-wrapped smokeless tobacco product portion.

An exemplary shape of a fiber-wrapped smokeless tobacco product 600 provided herein is shown in FIG. 6. FIG. 6 depicts a perspective view of the fiber-wrapped smokeless tobacco product 600 having a substantially rectangular cuboidal shape with rounded corners in the longitudinal (lengthwise) plane. In some cases, the preformed smokeless tobacco product has a substantially rectangular cuboidal shape having a length of between 15 mm and 50 mm, a width of between 5 mm and 20 mm, and a thickness of between 3 mm and 12 mm. For example, a substantially rectangular cuboidal shape could have a length of between 26 mm and 30 mm, a width of between 10 mm and 12 mm, and a thickness of between 6 mm and 8 mm. A product having a length of 28 mm, a width of 11 mm, and thickness of 7 mm could have a product weight of about 2.35 g. In other embodiments, a substantially rectangular cuboidal shape could have a length of between 18 and 21 mm, a width of between 10 mm and 12 mm, and a thickness of between 9 mm and 11 mm. In some cases, the preformed smokeless tobacco product 600 can be cube shaped. A smokeless tobacco product as described herein can have a number of different configurations, e.g., can have the configuration depicted in FIG. 6, or have a shape or a layered structure that is different from the particular embodiment of the fiber-wrapped smokeless tobacco product 600 depicted in FIG. 6. In some circumstances, the fiber-wrapped smokeless tobacco product can be configured to be: (A) an elliptical shaped fiber-wrapped smokeless tobacco product; (B) an elongated elliptical shaped fiber-wrapped smokeless tobacco product; (C) a semi-circular fiber-wrapped smokeless tobacco product; (D) a square- or rectangular-shaped fiber-wrapped smokeless tobacco product; (E) a football-shaped fiber-wrapped smokeless tobacco product; (F) an elongated rectangular-shaped fiber-wrapped smokeless tobacco product; (G) boomerang-shaped fiber-wrapped smokeless tobacco product; (H) a rounded-edge rectangular-shaped fiber-wrapped smokeless tobacco product; (I) teardrop- or comma-shaped fiber-wrapped smokeless tobacco product; (J) bowtie-shaped fiber-wrapped smokeless tobacco product; and (K) peanut-shaped fiber-wrapped smokeless tobacco product. Alternatively, the smokeless tobacco product can have different thicknesses or dimensionality, such that a beveled fiber-wrapped smokeless tobacco product (e.g., a wedge) is produced or a hemi-spherical shape is produced.

The smokeless tobacco product can be manipulated in a number of different ways. For example, particular embodiments of the smokeless tobacco product can be wrapped or coated in an edible or dissolvable film. The dissolvable film can readily dissipate when the smokeless tobacco product is placed in a mouth of an adult tobacco consumer. In addition, or in the alternative, some embodiments of the smokeless tobacco products can be embossed or stamped with a design (e.g., a logo, an image, a trademark, a product name, or the like). For example, a design also can be embossed or stamped into those embodiments having a dissolvable film applied thereto.

In some cases, the fiber-wrapped smokeless tobacco product is used in combination with other tobacco and non-tobacco ingredients to form a variety of smokeless tobacco products. For example, the fiber-wrapped smokeless tobacco product can include flavor beads.

Other Embodiments

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed

What is claimed is:

1. An apparatus for enrobing a product portion comprising:
   a polymer spray head configured to direct a plurality of polymeric fibers into a polymer enrobing zone;
   a holding device configured to hold the product portion, the holding device being configured to be moved through the polymer enrobing zone; and
   a polymer collection roller opposite the polymer enrobing zone, the polymer collection roller configured to collect polymeric fibers that are not wrapped around the product portion passing through the polymer enrobing zone.

2. The apparatus of claim 1, further comprising:
   a molding device configured to form the product portion in a mold cavity.

3. The apparatus of claim 2, wherein the molding device is configured to form the product portion around the holding device.

4. The apparatus of claim 2, further comprising:
   a robotic arm configured to insert the holding device into the mold cavity and to move the holding device between the mold cavity and the polymer enrobing zone.

5. The apparatus of claim 1, further comprising:
a cutting device configured to cut at least a portion of the holding device.

6. The apparatus of claim 1, further comprising:
a heating device configured to heat the holding device.

7. The apparatus of claim 1, wherein the apparatus is configured to rotate the holding device.

8. The apparatus of claim 1, wherein the apparatus is configured to change the orientation of the holding device.

9. The apparatus of claim 1, wherein the polymer spray head is configured to direct the plurality of polymeric fibers toward the polymer enrobing zone along two or more directions.

10. The apparatus of claim 1, wherein the polymer spray head is configured to distribute polymeric fibers evenly onto all surfaces of the body.

11. The apparatus of claim 1, wherein the holding device is configured to extend at least partially through a body of the product portion.

12. The apparatus of claim 1, wherein the holding device comprises a string.

13. The apparatus of claim 1, wherein the holding device comprises a first needle.

14. The apparatus of claim 13, wherein the holding device further comprises a second needle.

15. The apparatus of claim 14, wherein the first needle is configured to extend into a side of a body of the product portion, and the second needle is configured to extend into the side of the body.

16. The apparatus of claim 14, wherein the first needle is configured to extend into a first side of a body of the product portion, and the second needle is configured to extend into a second side of the body opposite the first side of the body.

17. The apparatus of claim 1, further comprising:
a stripping device configured to remove the product portion from the holding device.

18. The apparatus of claim 6, wherein the heating device comprises an induction heater.

\* \* \* \* \*